(12) United States Patent  
Patil et al.

(10) Patent No.: US 8,812,680 B2  
(45) Date of Patent: Aug. 19, 2014

(54) METHODS AND APPARATUS FOR PEER DISCOVERY INTERFERENCE MANAGEMENT IN A WIRELESS WIDE AREA NETWORK

(75) Inventors: Shailesh Patil, Bridgewater, NJ (US); Xinzhou Wu, Monmouth Junction, NJ (US); Hua Wang, Bridgewater, NJ (US); Junyi Li, Chester, NJ (US); Thomas J. Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 316 days.

(21) Appl. No.: 13/232,193

(22) Filed: Sep. 14, 2011

(65) Prior Publication Data

US 2013/0066966 A1 Mar. 14, 2013

(51) Int. Cl.
  *G06F 15/177* (2006.01)
  *H04W 8/00* (2009.01)
  *H04W 72/06* (2009.01)

(52) U.S. Cl.
  CPC .............. *H04W 8/005* (2013.01); *H04W 72/06* (2013.01)
  USPC .......................................... 709/226; 709/220

(58) Field of Classification Search
  None
  See application file for complete search history.

(56) References Cited

U.S. PATENT DOCUMENTS

| | | |
|---|---|---|
| 6,745,038 B2 | 6/2004 | Callaway, Jr. et al. |
| 7,984,132 B2 | 7/2011 | Park et al. |
| 2005/0124335 A1 | 6/2005 | Cave et al. |
| 2005/0220106 A1 | 10/2005 | Raverdy et al. |
| 2009/0233635 A1 | 9/2009 | Li et al. |
| 2009/0238251 A1 | 9/2009 | Rofougaran |
| 2009/0310516 A1 | 12/2009 | Goel et al. |
| 2010/0022190 A1 | 1/2010 | Laroia et al. |
| 2010/0093280 A1 | 4/2010 | Ahn et al. |
| 2010/0110999 A1 | 5/2010 | Li et al. |
| 2010/0128701 A1 | 5/2010 | Nagaraja |
| 2010/0136997 A1 | 6/2010 | Palanki et al. |
| 2010/0165882 A1 | 7/2010 | Palanki et al. |
| 2010/0189188 A1 | 7/2010 | Li et al. |

(Continued)

FOREIGN PATENT DOCUMENTS

WO  03003610 A1  1/2003

OTHER PUBLICATIONS

Kaufman et al., Cellular Networks with an Overlaid DEvice to Device Network, 2008, pp. 1537-1541.*

(Continued)

*Primary Examiner* — Yves Dalencourt
*Assistant Examiner* — Clayton R Williams
(74) *Attorney, Agent, or Firm* — James K. O'Hare

(57) ABSTRACT

A method of operating a wireless device is provided in which the wireless device determines to use one grouping of peer discovery resources of a plurality of groupings of peer discovery resources based on one of a path loss or a distance to a base station. The plurality of groupings include a first grouping of resources having a first plurality of identical subsets of resources and a second grouping of resources having a second plurality of identical subsets of resources. Each of the first plurality of identical subsets of resources extends over at least one of a different time period or a different number of subcarriers than each of the second plurality of identical subsets of resources. The wireless device transmits a peer discovery signal on one subset of the identical subsets of said one grouping of peer discovery resources.

24 Claims, 17 Drawing Sheets

(56) References Cited

U.S. PATENT DOCUMENTS

| | | |
|---|---|---|
| 2010/0190459 A1 | 7/2010 | Li et al. |
| 2010/0254281 A1* | 10/2010 | Kim et al. ................ 370/252 |
| 2010/0317291 A1 | 12/2010 | Richardson |
| 2011/0205969 A1 | 8/2011 | Ahmad et al. |
| 2012/0093098 A1* | 4/2012 | Charbit et al. ................ 370/329 |

OTHER PUBLICATIONS

International Search Report and Written Opinion—PCT/US2012/055190—ISA/EPO—Dec. 10, 2012.

\* cited by examiner

METHODS AND APPARATUS FOR PEER DISCOVERY INTERFERENCE MANAGEMENT IN A WIRELESS WIDE AREA NETWORK

BACKGROUND

1. Field

The present disclosure relates generally to communication systems, and more particularly, to peer discovery interference management in a wireless wide area network (WWAN).

2. Background

In a WWAN, all communication between mobiles goes through uplink/downlink channels between wireless devices and the base station. Two communicating wireless devices that are in the vicinity of each other may communicate directly without going through the base station. Such direct peer-to-peer communication can enable new types of services and/or reduce the traffic load on the base station.

To enable peer-to-peer communication, wireless devices in the vicinity of each other must be able to discover each other. Wireless devices may discover each other by periodically transmitting peer discovery signals. The presence of a wireless device may be detected by receiving and decoding the peer discovery signal from that wireless device. A WWAN base station may set aside time frequency resources for wireless devices to transmit their peer discovery signals. The allocated time frequency resources may be concurrent with downlink and/or uplink WWAN resources.

In order to maximize the range of peer discovery, wireless devices may transmit their peer discovery signals at a maximum power. Transmission of peer discovery signals at maximum power can cause interference to WWAN (or other non peer discovery) communication in neighboring cells which are scheduled on the same time/frequency resource. This scenario can arise when an adjacent base station sets aside different resources for peer discovery and/or when the serving base station and an adjacent base station are not fully synchronized. The interference to WWAN communication may be reduced by reducing a transmission power. However, reducing the transmission power decreases the range of peer discovery and/or increases the latency of peer discovery. As such, techniques are needed for reducing interference to WWAN communication due to the transmission of peer discovery signals that have less impact on the range/latency of peer discovery.

SUMMARY

In an aspect of the disclosure, a method of operating a wireless device, a computer program product, and an apparatus are provided. The apparatus determines to use one grouping of peer discovery resources of a plurality of groupings of peer discovery resources based on one of a path loss or a distance to a base station. The plurality of groupings include a first grouping of resources having a first plurality of identical subsets of resources and a second grouping of resources having a second plurality of identical subsets of resources. Each of the first plurality of identical subsets of resources extends over at least one of a different time period or a different number of subcarriers than each of the second plurality of identical subsets of resources. The apparatus transmits a peer discovery signal on one subset of the identical subsets of said one grouping of peer discovery resources.

In an aspect of the disclosure, a method of operating a base station, a computer program product, and an apparatus are provided. The apparatus determines a path loss or a distance to each of a plurality of wireless devices. The apparatus transmits information to the wireless devices instructing the wireless devices to use peer discovery resources based on the determined path loss or distance.

DETAILED DESCRIPTION

Figure 1:
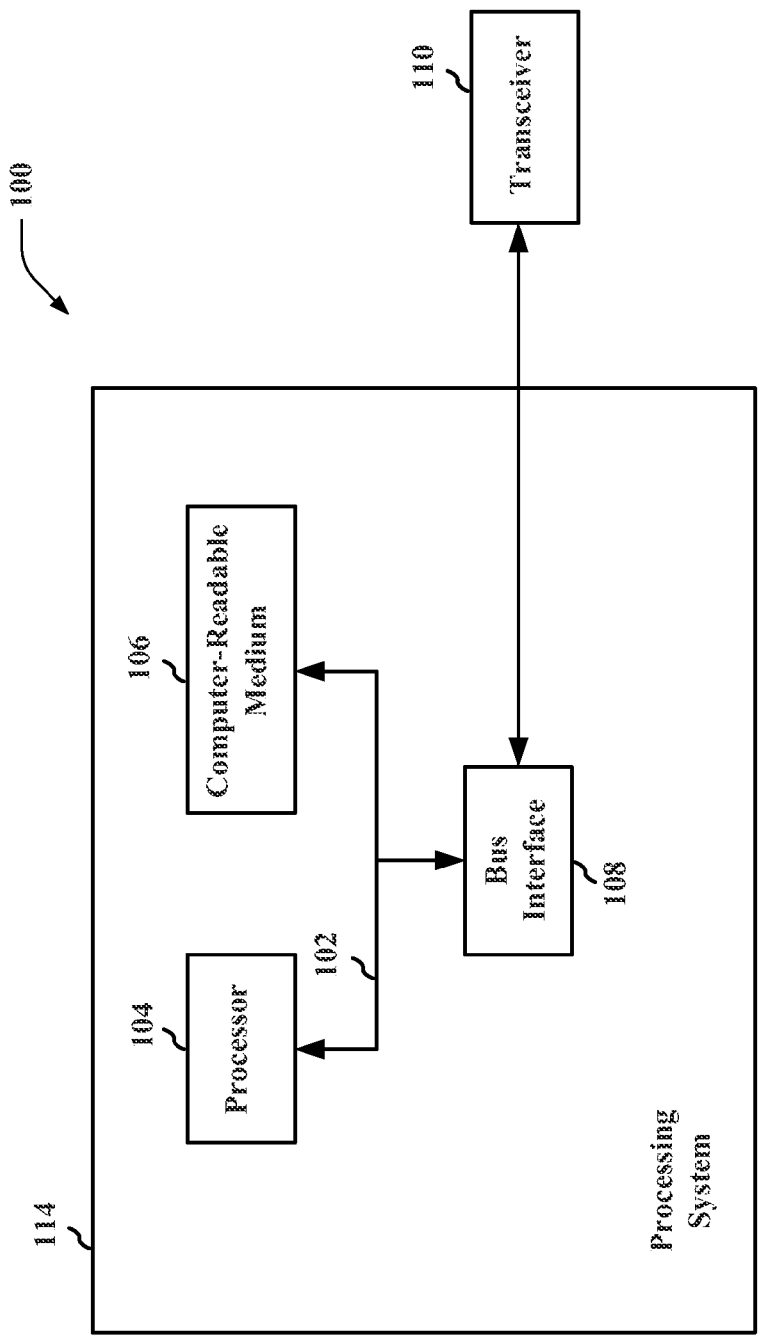
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors and/or hardware modules, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
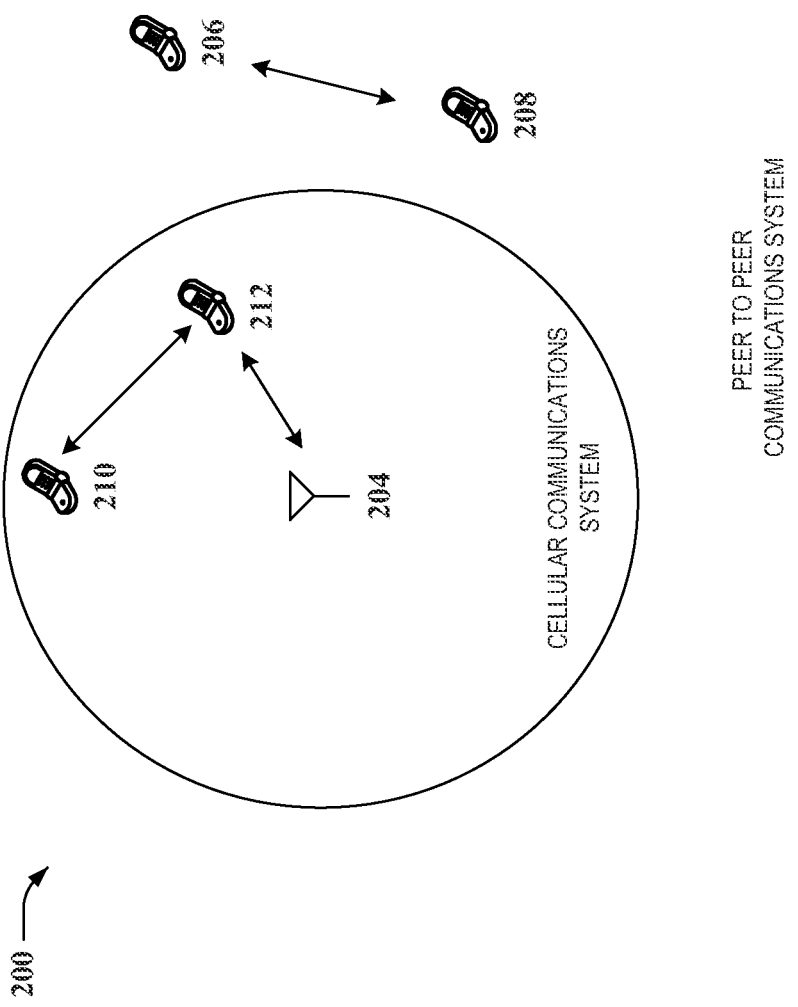
FIG. 2 is a drawing of a wireless peer-to-peer communications system.

FIG. 2 is a drawing of an exemplary peer-to-peer communications system 200. The peer-to-peer communications system 200 includes a plurality of wireless devices 206, 208, 210, 212. The peer-to-peer communications system 200 may overlap with a cellular communications system, such as for example, a wireless wide area network (WWAN). Some of the wireless devices 206, 208, 210, 212 may communicate together in peer-to-peer communication, some may communicate with the base station 204, and some may do both. For example, as shown in FIG. 2, the wireless devices 206, 208 are in peer-to-peer communication and the wireless devices 210, 212 are in peer-to-peer communication. The wireless device 212 is also communicating with the base station 204.

The wireless device may alternatively be referred to by those skilled in the art as user equipment, a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ. However, one of ordinary skill in the art would understand that the exemplary methods and apparatuses are applicable more generally to a variety of other wireless peer-to-peer communication systems.

Figure 3:
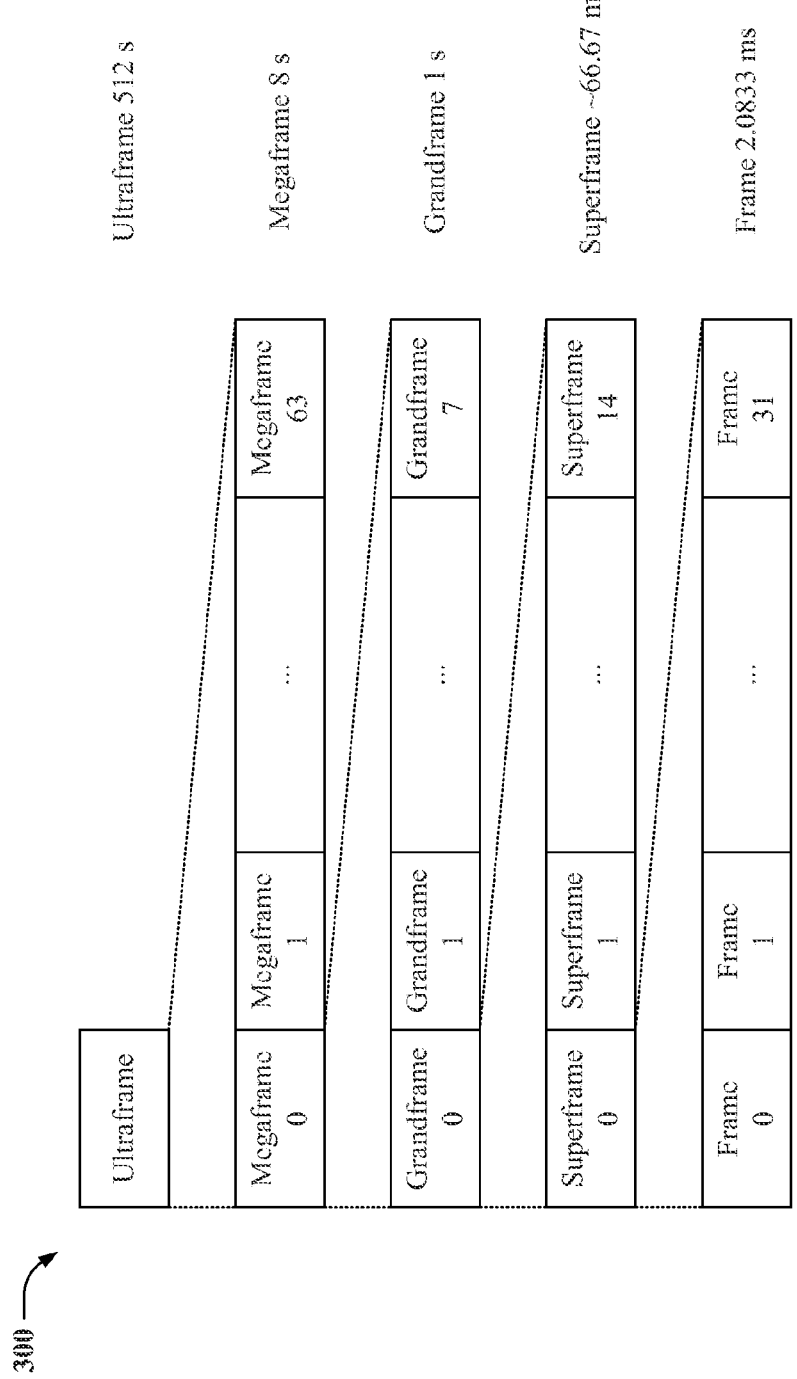
FIG. 3 is a diagram illustrating an exemplary time structure for peer-to-peer communication between the wireless devices.

FIG. 3 is a diagram 300 illustrating an exemplary time structure for peer-to-peer communication between the wireless devices 100. An ultraframe is 512 seconds and includes 64 megaframes. Each megaframe is 8 seconds and includes 8 grandframes. Each grandframe is 1 second and includes 15 superframes. Each superframe is approximately 66.67 ms and includes 32 frames. Each frame is 2.0833 ms.

Figure 4:
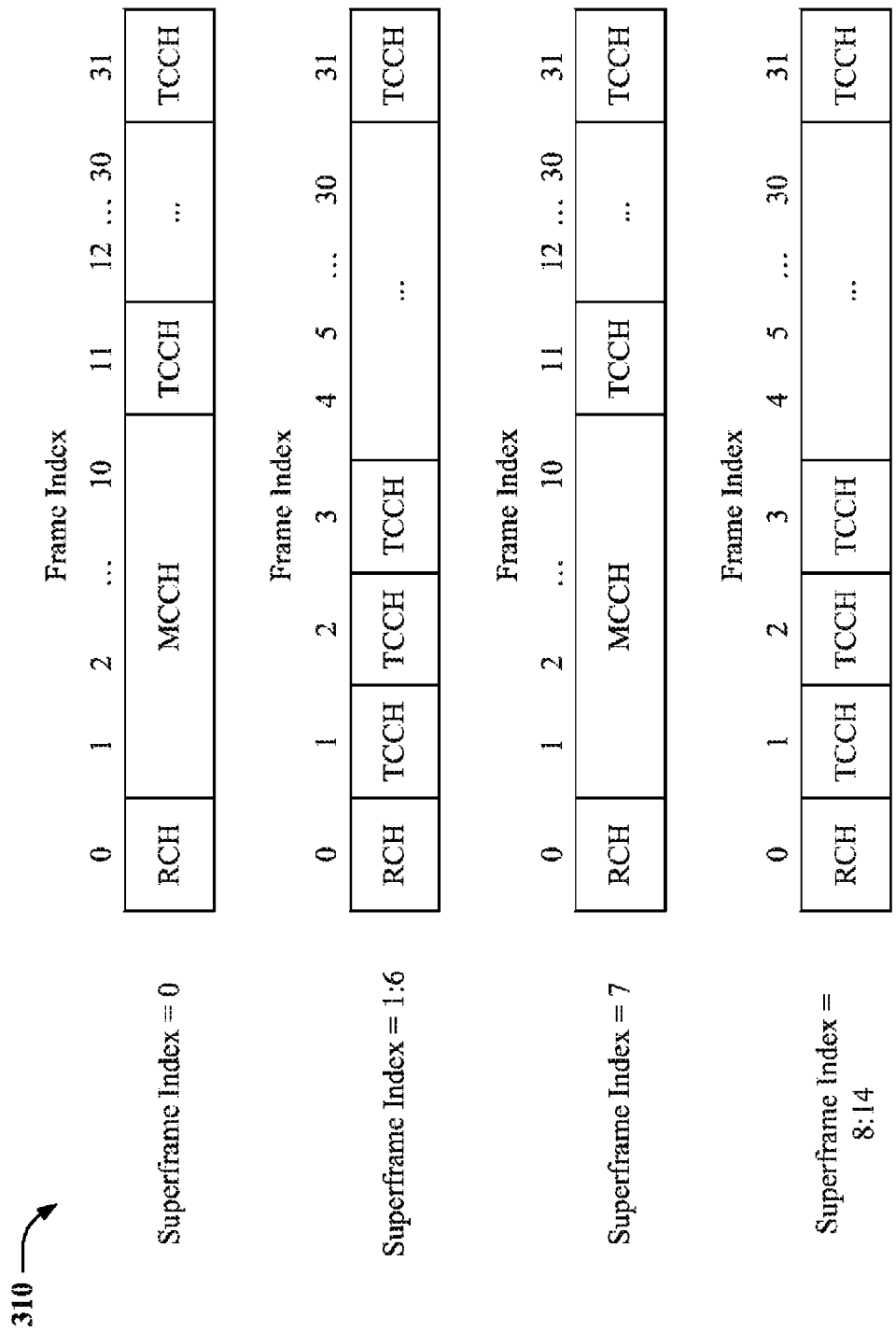
FIG. 4 is a diagram illustrating the channels in each frame of superframes in one grandframe.

FIG. 4 is a diagram 310 illustrating the channels in each frame of superframes in one grandframe. In a first superframe (with index 0), frame 0 is a reserved channel (RCH), frames 1-10 are each a miscellaneous channel (MCCH), and frames 11-31 are each a traffic channel (TCCH). In the $2^{nd}$ through $7^{th}$ superframes (with index 1:6), frame 0 is a RCH and frames 1-31 are each a TCCH. In an $8^{th}$ superframe (with index 7), frame 0 is a RCH, frames 1-10 are each a MCCH, and frames 11-31 are each a TCCH. In the $9^{th}$ through $15^{th}$ superframes (with index 8:14), frame 0 is a RCH and frames 1-31 are each a TCCH. The MCCH of superframe index 0 includes a secondary timing synchronization channel, a peer discovery channel, a peer page channel, and a reserved slot. The MCCH of superframe index 7 includes a peer page channel and reserved slots. The TCCH includes connection scheduling, a pilot, channel quality indicator (CQI) feedback, a data segment, and an acknowledgement (ACK).

Figure 5:
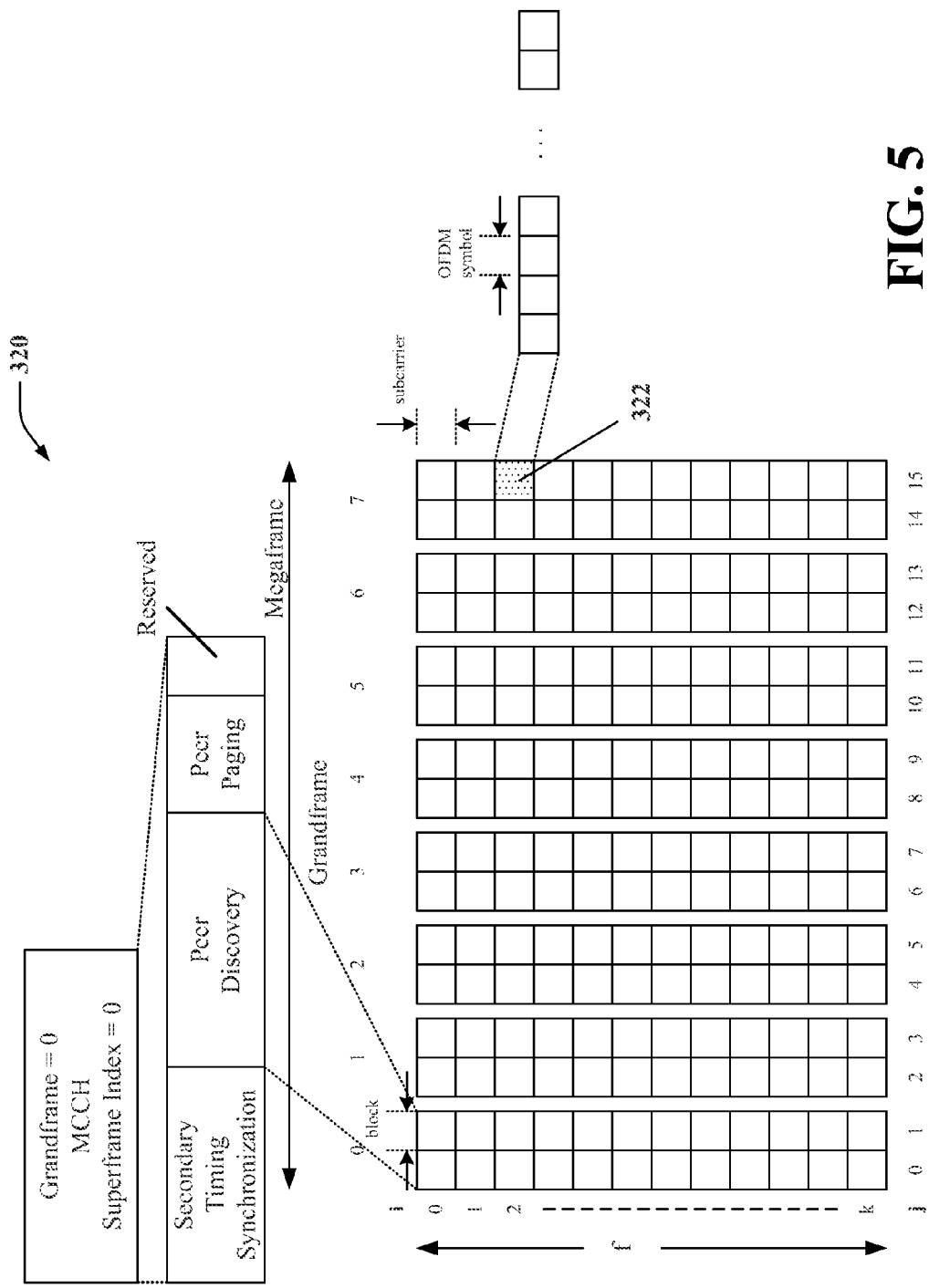
FIG. 5 is a diagram illustrating an operation timeline of a miscellaneous channel and a structure of a peer discovery channel.

FIG. 5 is a diagram 320 illustrating an operation timeline of the MCCH and an exemplary structure of a peer discovery channel. As discussed in relation to FIG. 4, the MCCH of superframe index 0 includes a secondary timing synchronization channel, a peer discovery channel, a peer paging channel, and a reserved slot. The peer discovery channel may be divided into subchannels. For example, the peer discovery channel may be divided into a long range peer discovery channel, a medium range peer discovery channel, a short range peer discovery channel, and other channels. Each of the subchannels may include a plurality of blocks/resources for communicating peer discovery information. Each block may include a plurality of orthogonal frequency-division multiplexing (OFDM) symbols (e.g., 72) at the same subcarrier. FIG. 5 provides an example of a subchannel (e.g., short range peer discovery channel) including blocks in one megaframe, which includes the MCCH superframe index 0 of grandframes 0 through 7. Different sets of blocks correspond to different peer discovery resource identifiers (PDRIDs). For example, one PDRID may correspond to one of the blocks in the MCCH superframe index 0 of one grandframe in the megaframe.

Upon power up, a wireless device listens to the peer discovery channel for a period of time (e.g., two megaframes) and selects a PDRID based on a determined energy on each of the PDRIDs. For example, a wireless device may select a PDRID corresponding to block 322 (i=2 and j=15) in a first megaframe of an ultraframe. The particular PDRID may map to other blocks in other megaframes of the ultraframe due to hopping. In blocks associated with the selected PDRID, the wireless device transmits its peer discovery signal. In blocks unassociated with the selected PDRID, the wireless device listens for peer discovery signals transmitted by other wireless devices.

The wireless device may also reselect a PDRID if the wireless device detects a PDRID collision. That is, a wireless device may listen rather than transmit on its available peer discovery resource in order to detect an energy on the peer discovery resource corresponding to its PDRID. The wireless device may also detect energies on other peer discovery resources corresponding to other PDRIDs. The wireless device may reselect a PDRID based on the determined energy on the peer discovery resource corresponding its PDRID and the detected energies on the other peer discovery resources corresponding to other PDRIDs.

Figure 6:
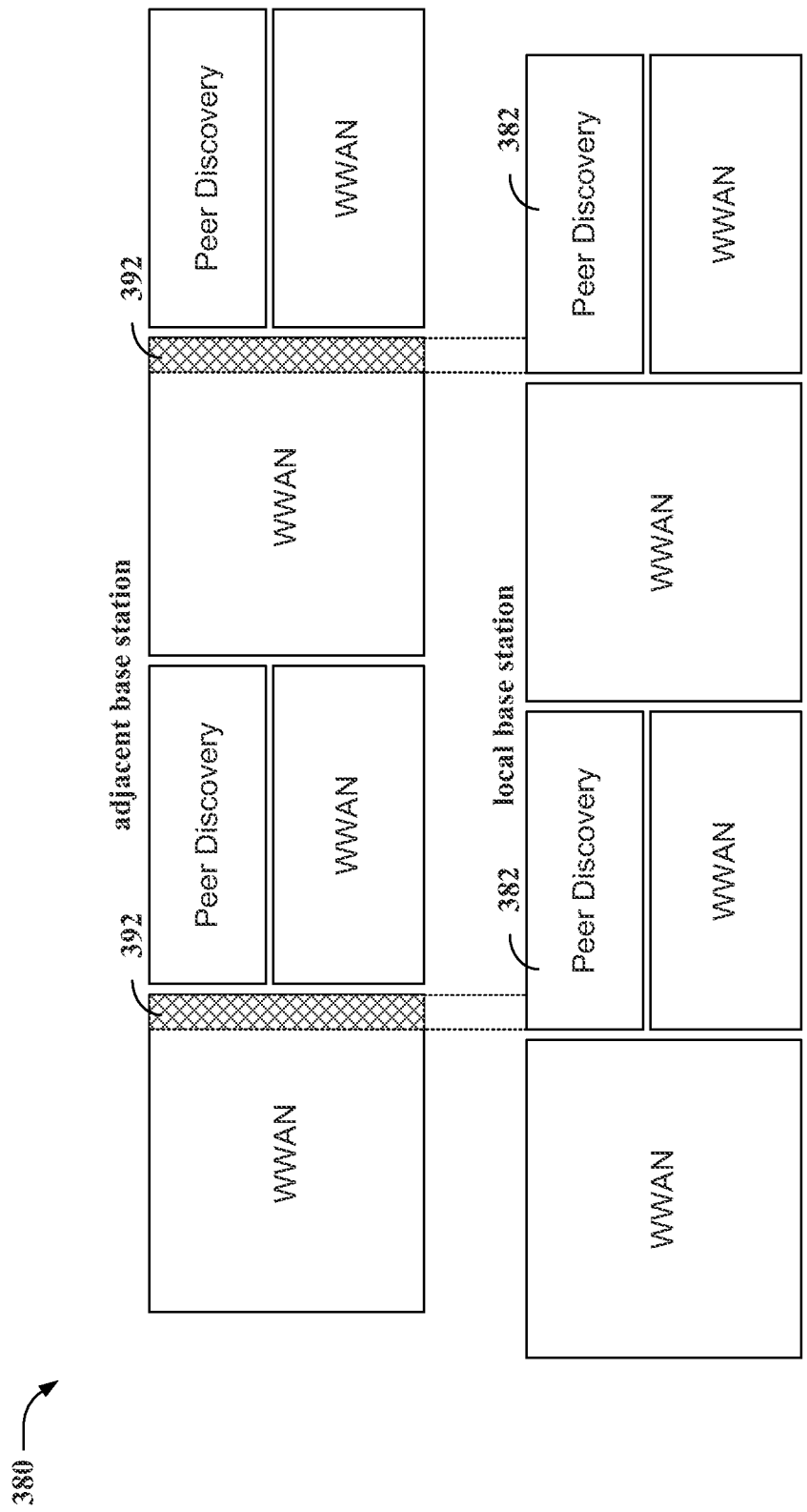
FIG. 6 is a diagram illustrating concurrent peer discovery and WWAN resources of a local base station and overlapping resources of a neighboring base station.

FIG. 6 is a diagram 380 illustrating concurrent peer discovery and WWAN resources of a local base station and overlapping resources of a neighboring base station. As shown in FIG. 6, WWAN resources may be concurrent with peer discovery resources. When the peer discovery resources 382 of the local base station (e.g., serving base station) overlap with WWAN resources 392 allocated by an adjacent base station (e.g., allocating different resources, not fully synchronized resources), the peer discovery signals transmitted in the peer discovery resources 382 may cause interference to WWAN communication occurring in the overlapped portions of neighboring base stations. As such, methods are needed to reduce the WWAN interference caused by the transmission of peer discovery signals.

Figure 7:
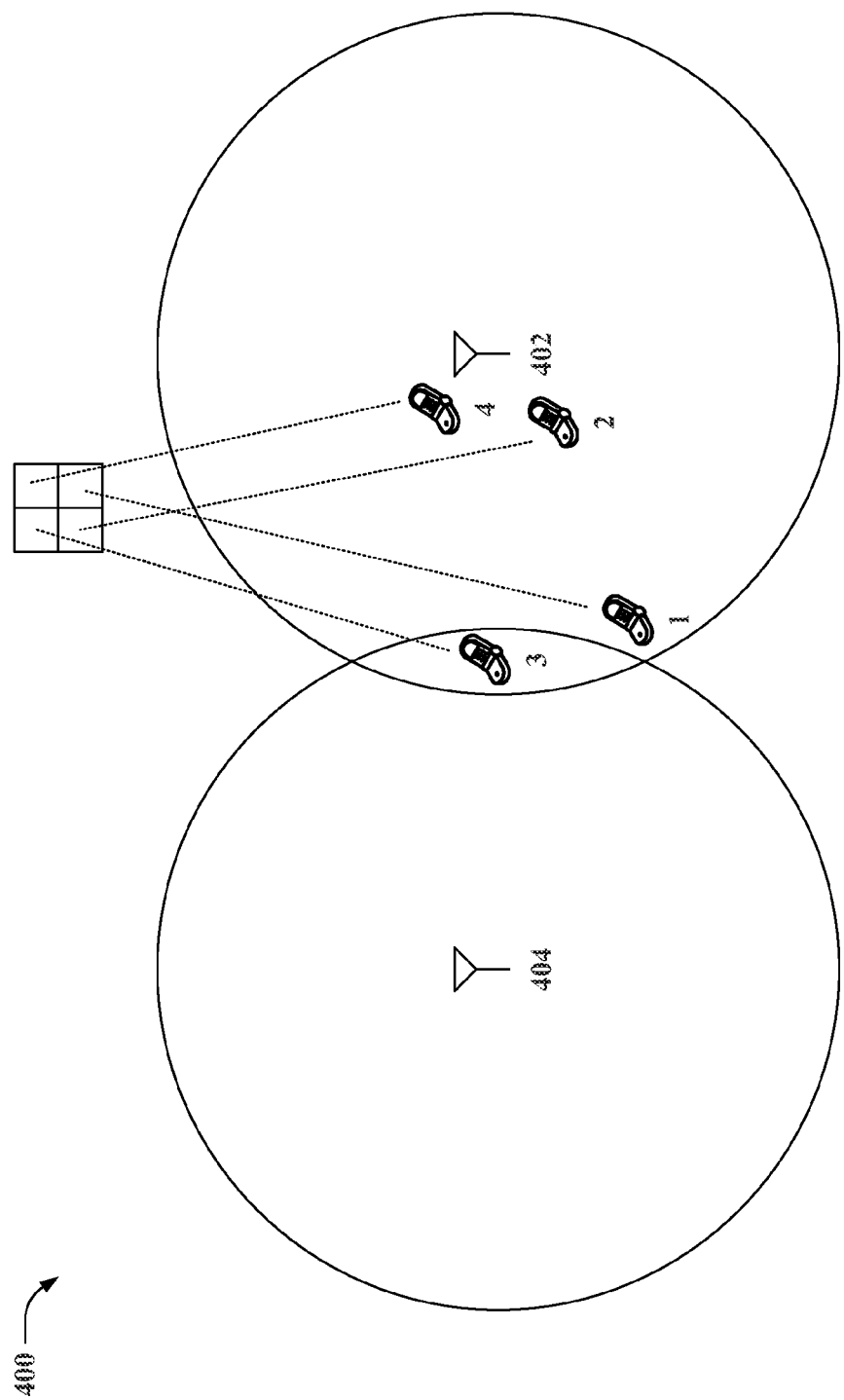
FIG. 7 is a first diagram for illustrating a first exemplary method.

FIG. 7 is a first diagram 400 for illustrating the first exemplary method. One method to reduce WWAN interference to a neighboring base station 404 is to reduce the maximum interference caused at any given moment of time. The maximum interference may be reduced through controlling which wireless devices simultaneously transmit their peer discovery signals. According to the exemplary method, the base station 402 determines a path loss or a distance to each of the wireless devices 1, 2, 3, 4 and transmits information to the wireless devices 1-4 instructing the wireless devices 1-4 to use peer discovery resources based on the determined path loss or distance. The base station 402 distributes an allocation of the peer discovery resources to the wireless devices 1-4 such that resources allocated to wireless devices 2, 4 with a path loss or a distance less than a threshold and to wireless devices 1, 3, with a path loss or a distance greater than the threshold are approximately evenly distributed across each set of time concurrent resources of the peer discovery resources. As shown in FIG. 7, the base station 402 distributes the allocation of the peer discovery resources so that the wireless devices 2, 3 transmit peer discovery signals concurrently and the wireless devices 1, 4 transmit peer discovery signals concurrently. By distributing the allocation of the peer discovery resources for wireless devices 1, 3 near the cell edge with the wireless devices 2, 4 near the cell center, the simultaneous transmission of peer discovery signals by the wireless devices 1, 3 can be avoided. The simultaneous transmission of peer discovery signals by the wireless devices 1, 3 would maximize the interference to the WWAN communication of the base station 404 and therefore should be avoided.

Figure 8:
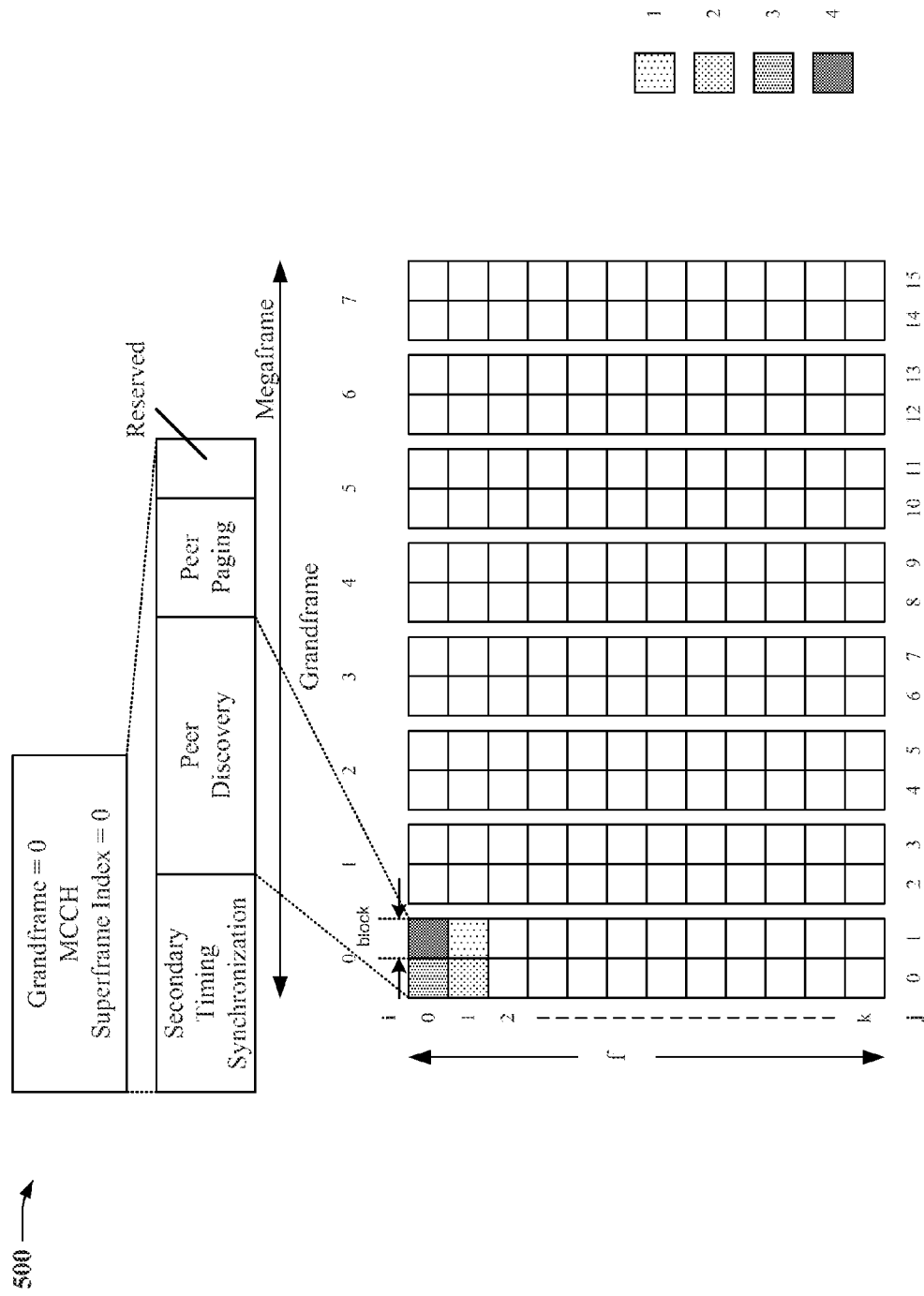
FIG. 8 is a second diagram for illustrating the first exemplary method.

FIG. 8 is a second diagram 500 for illustrating the first exemplary method. As discussed supra, the base station 402 may determine a path loss or a distance to each of the wireless devices 1-4. Based on the path loss or the distance, the base station 402 may allocate resources for peer discovery in order to reduce the WWAN interference to the neighboring base station 404 due to the simultaneous transmission of peer discovery signals. As shown in FIG. 8, the base station 402 may allocate block i, j of grandframe 0 for i=0, 1 and j=0, 1 by allocating block 0, 0 to the wireless device 3; block 1, 0 to the wireless device 2; block 0, 1 to the wireless device 4; and block 1, 1 to the wireless device 1. Through the aforementioned allocation, the wireless devices 1, 3 with a higher path loss and a greater distance to the base station 402 may be allocated concurrent resources with the wireless devices 2, 4 with a lower pass loss and a lesser distance to the base station 402.

Figure 9:
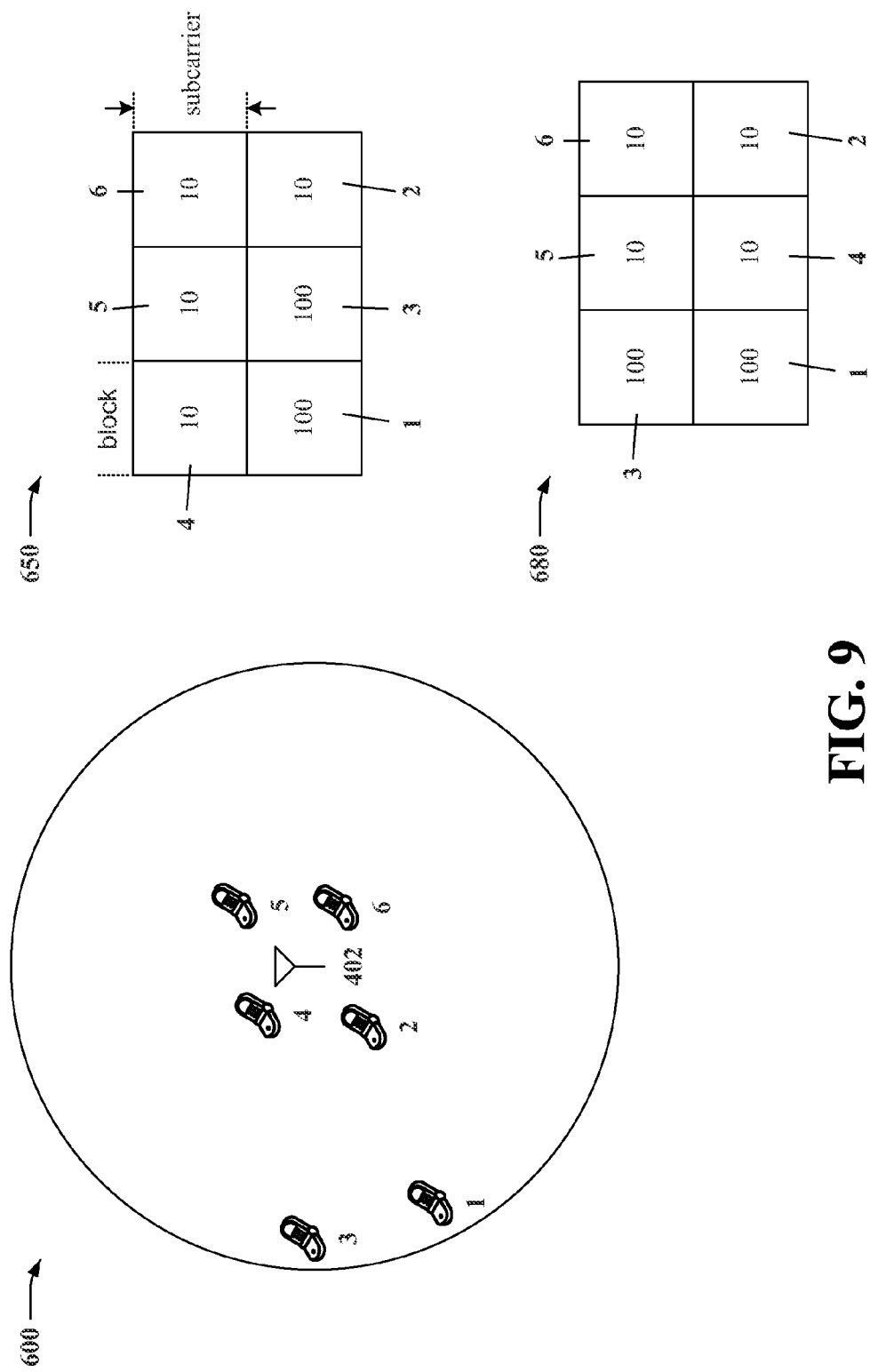
FIG. 9 is a third diagram for illustrating the first exemplary method.

FIG. 9 is a third diagram 600 for illustrating the first exemplary method. According to an exemplary method, the base station 402 determines the path loss or the distance of the wireless devices 1-6. Assume the path loss to each of the wireless devices 1, 3 is 100 dB and the path loss to each of the wireless devices 2, 4, 5, 6 is 10 dB. The base station 402 distributes an allocation of the peer discovery resources to the wireless devices 1-6 such that resources allocated to wireless devices 2, 4, 5, 6 with a path loss less than a threshold and to wireless devices 1, 3 with a path loss greater than the threshold are approximately evenly distributed across each set of time concurrent resources of the peer discovery resources. The base station 402 may distribute the allocation of the peer discovery resources by summing the path losses (or distances if distance is used for allocating the peer discovery resources) for each set of concurrent resources such that at least one of a maximum is minimized or a minimum is maximized across the concurrent resources. Other methods are possible for distributing the allocation of the peer discovery resources, such as by summing the path losses or distances for each set of concurrent resources and minimizing a weighted sum (with the weight being greater with a greater sum) of the sums across the concurrent resources. For example, if a sum of less than 60 dB is weighted with a weight 1, a sum between 60 dB and 120 dB is weighted with weight 2, and a sum greater than 120 dB is weighted with weight 4, the sum S=110*2+110*2+20 is less than the sum S=200*4+20+20, and therefore a distribution corresponding to that shown in the diagram 650 may be selected over a distribution corresponding to that shown in the diagram 680.

Figure 10:
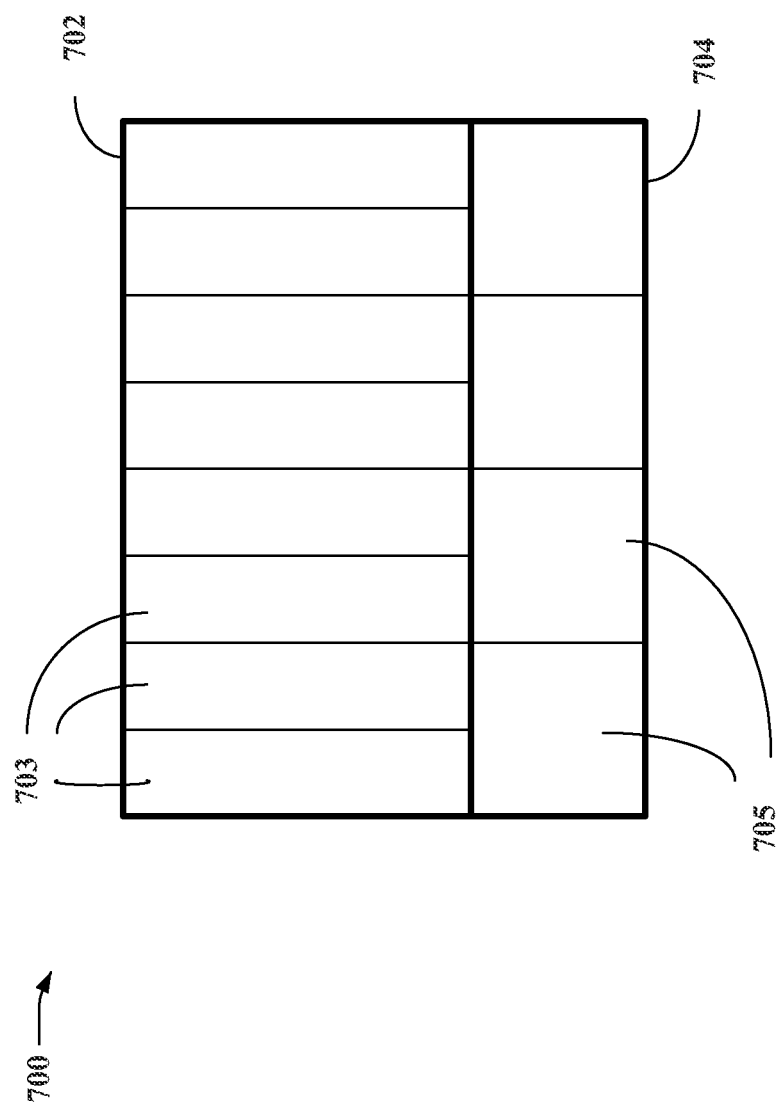
FIG. 10 is a first diagram for illustrating a second exemplary method.

FIG. 10 is a diagram 700 for illustrating a second exemplary method. According to the second exemplary method, the peer discovery resources may be divided into groups of resources that are parallel in time. Wireless devices may select the group of peer discovery resources on which to transmit their peer discovery signals based on their distance or path loss to the base station. Because the groups are parallel to each other, a maximum interference at any given moment in time may be controlled. For example, wireless devices that are near the cell edge may transmit on the peer discovery resources 703 and wireless devices that are near the base station may transmit on the peer discovery resources 705. The opposite is also possible, and therefore wireless devices that are near the cell edge may transmit on the peer discovery resources 705 and wireless devices that are near the base station may transmit on the peer discovery resources 703. The peer discovery resources 703 have more tones/subcarriers and fewer OFDM symbols than the peer discovery resources 705. Through the second exemplary method, the wireless devices that transmit their peer discovery signals concurrently may be controlled while constraining the number of wireless devices that transmit concurrently. As such, wireless devices may control the interference they cause to WWAN communication of neighboring base stations. One disadvantage of the second exemplary method is that the wireless devices that transmit peer discovery signals in the peer discovery resources 703 will experience a loss in peer discovery range in comparison to the wireless devices that transmit peer discovery signals in the peer discovery resources 705, as the transmit power will be spread across the tones/subcarriers at the same OFDM symbol (i.e., amount of transmit power used in any one resource element will be lower). However, the method may result in less of a decrease in the peer discovery range and/or a decrease in the latency of peer discovery than if the total transmit power were reduced for the transmission of the peer discovery signals.

Accordingly, according to the second exemplary method, a wireless device determines to use one grouping of peer discovery resources (702 or 704) of a plurality of groupings of peer discovery resources 702, 704 based on one of a path loss or a distance to a base station. The plurality of groupings 702, 704 include a first grouping of resources 702 having a first plurality of identical subsets of resources 703 and a second grouping of resources 704 having a second plurality of identical subsets of resources 705. Each of the first plurality of identical subsets of resources 703 extends over at least one of a different time period (i.e., OFDM symbols) or a different number of subcarriers than each of the second plurality of identical subsets of resources 705. In addition, the wireless device transmits a peer discovery signal on one subset of the identical subsets of said one grouping of peer discovery resources.

Figure 11:
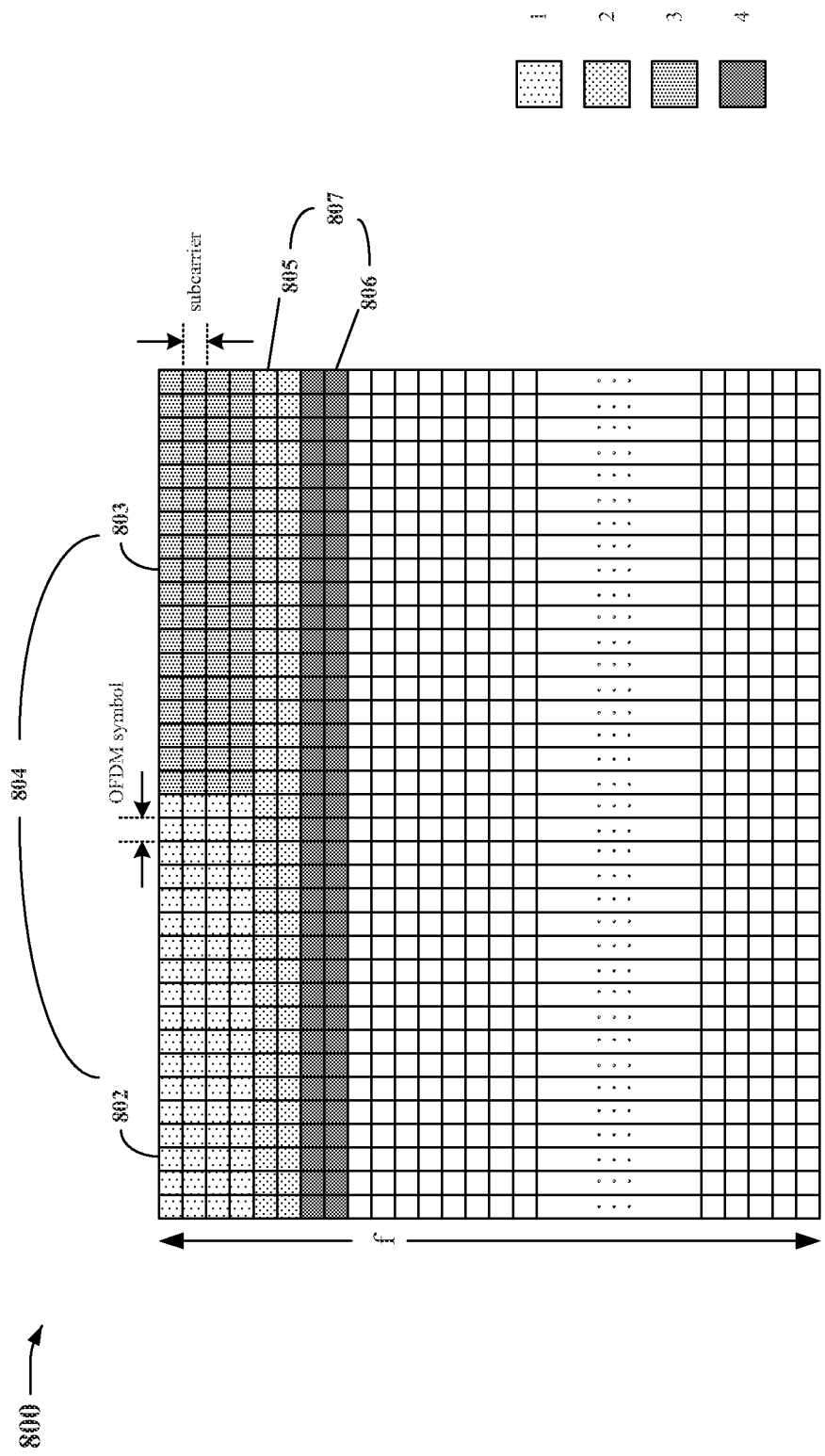
FIG. 11 is a second diagram for illustrating the second exemplary method.

FIG. 11 is a second diagram 800 for illustrating the second exemplary method. As shown in FIG. 11, the wireless device 1 may determine to use the peer discovery resources 802, the wireless device 3 may determine to use the peer discovery resources 803, the wireless device 2 may determine to use the peer discovery resources 805, and the wireless device 4 may determine to use the peer discovery resources 806. The peer discovery resources 802, 803 each include four subcarriers and 18 OFDM symbols. The peer discovery resources 805, 806 each include two subcarriers and 36 OFDM symbols. The wireless devices 1, 3 that are closer to the cell edge and farther from the base station are assigned to the peer discovery resources with a greater number of subcarriers and a lesser number of OFDM symbols. The wireless devices 2, 4 that are farther from the cell edge and closer to the base station are assigned to the peer discovery resources with a lesser number of subcarriers and a greater number of OFDM symbols.

According to the second exemplary method, the wireless device 1 determines to use one grouping 804 of peer discovery resources of a plurality of groupings 804, 807 of peer discovery resources based on one of a path loss or a distance to a base station. The plurality of groupings 804, 807 include a first grouping 804 of resources having a first plurality of identical subsets of resources 802, 803 and a second grouping 807 of resources having a second plurality of identical subsets of resources 805, 806. Each of the first plurality of identical subsets of resources 802, 803 extends over at least one of a different time period (i.e., OFDM symbols) or a different number of subcarriers than each of the second plurality of identical subsets of resources 805, 806. The wireless device 1 transmits a peer discovery signal on one subset 802 of the identical subsets 802, 803 of the one grouping 804 of peer discovery resources.

As shown in FIG. 11, each of the first plurality of identical subsets of resources 802, 803 extends over a different time period and a different number of subcarriers than each of the second plurality of identical subsets of resources 805, 806. Each of the first plurality of identical subsets of resources 802, 803 extends over a first time period (i.e., OFDM symbols) (e.g., 18 OFDM symbols) and over a first number of subcarriers (e.g., four subcarriers) and each of the second plurality of identical subsets of resources 805, 806 extends over a second time period (i.e., OFDM symbols) (e.g., 36 OFDM symbols) and over a second number of subcarriers (e.g., two subcarriers). The first time period is less than the second time period (i.e., 18 OFDM symbols<36 OFDM symbols) and the first number of subcarriers is greater than the second number of subcarriers (i.e., four subcarriers>two subcarriers). Each of the first plurality of identical subsets of resources 802, 803 extends over a different number of subcarriers than each of the second plurality of identical subsets of resources 805, 806. Each of the first plurality of identical subsets of resources 802, 803 extends over a first number of subcarriers (e.g., four subcarriers) and each of the second plurality of identical subsets of resources 805, 806 extends over a second number of subcarriers (e.g., two subcarriers). The first number of subcarriers is greater than the second number of subcarriers (i.e., four subcarriers>two subcarriers).

In one configuration, each of the wireless devices 1-4 determines to use the grouping of peer discovery resources by determining to use resources in the first plurality of identical subsets of resources 802, 803 when the wireless device has a path loss or a distance to a serving base station that is greater than a first threshold greater than zero, and by determining to use resources in the second plurality of identical subsets of resources 805, 806 when the wireless device has a path loss or a distance to the serving base station that is less than a second threshold greater than zero.

In another configuration, each of the wireless devices 1-4 determines to use the grouping of peer discovery resources by determining to use resources in the first plurality of identical subsets of resources 802, 803 when the wireless device has a path loss or a distance to a neighboring base station that is less than a first threshold greater than zero, and by determining to use resources in the second plurality of identical subsets of resources 805, 806 when the wireless device has a path loss or a distance to the neighboring base station that is greater than a second threshold greater than zero. In such a configuration, the wireless devices 2, 4 may be assigned to the peer discovery resources 804 and the wireless devices 1, 3 may be assigned to the peer discovery resources 807.

Figure 12:
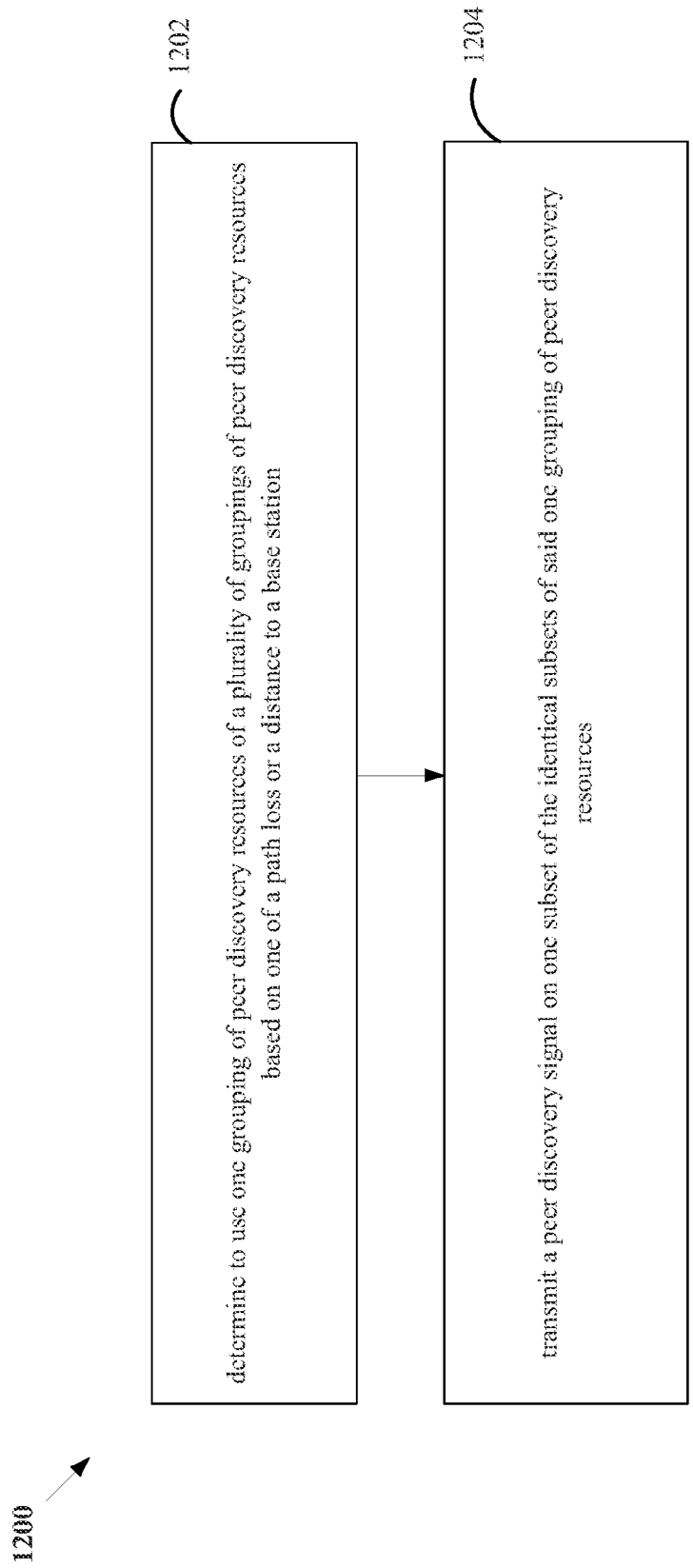
FIG. 12 is a flow chart of a method of wireless communication of a wireless device.

FIG. 12 is a flow chart 1200 of a method of wireless communication of a wireless device. According to the method, the wireless device determines to use one grouping of peer discovery resources of a plurality of groupings of peer discovery resources based on one of a path loss or a distance to a base station (1202). The plurality of groupings include a first grouping of resources having a first plurality of identical subsets of resources and a second grouping of resources having a second plurality of identical subsets of resources. Each of the first plurality of identical subsets of resources extends over at least one of a different time period or a different number of subcarriers than each of the second plurality of identical subsets of resources. In addition, the wireless device transmits a peer discovery signal on one subset of the identical subsets of said one grouping of peer discovery resources (1204).

In one configuration, each of the first plurality of identical subsets of resources extends over a different time period and a different number of subcarriers than each of the second plurality of identical subsets of resources. In one configuration, each of the first plurality of identical subsets of resources extends over a first time period and over a first number of subcarriers, and each of the second plurality of identical subsets of resources extends over a second time period and over a second number of subcarriers. The first time period is less than the second time period, and the first number of subcarriers is greater than the second number of subcarriers. In one configuration, each of the first plurality of identical subsets of resources extends over a different number of subcarriers than each of the second plurality of identical subsets of resources, each of the first plurality of identical subsets of resources extends over a first number of subcarriers, each of the second plurality of identical subsets of resources extends over a second number of subcarriers, and the first number of subcarriers is greater than the second number of subcarriers.

Figure 13:
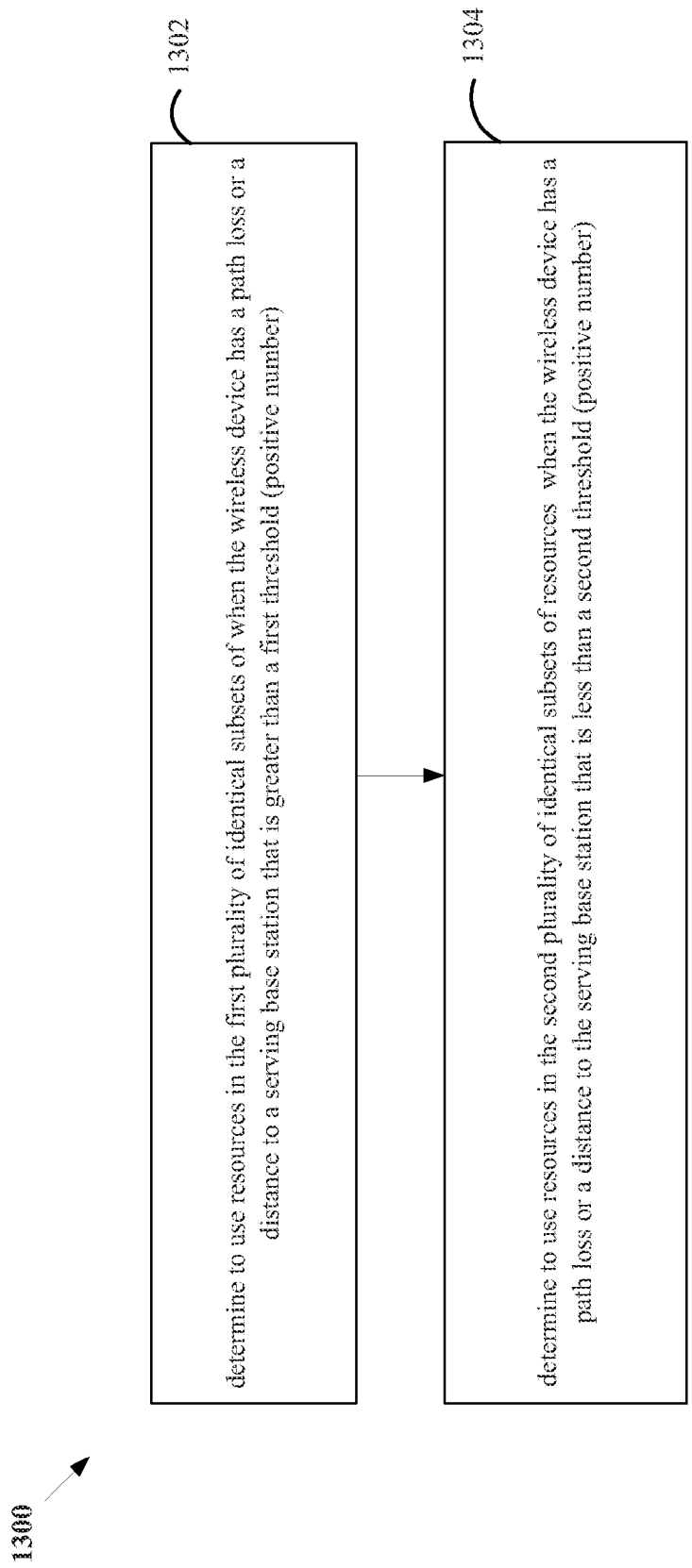
FIG. 13 is a flow chart of another method of wireless communication of a wireless device.

FIG. 13 is a flow chart 1300 of another method of wireless communication of a wireless device. According to the method, a wireless device determines to use the one grouping of peer discovery resources (1202) by determining to use resources in the first plurality of identical subsets of resources when the wireless device has a path loss or a distance to a serving base station that is greater than a first threshold (1302), and by determining to use resources in the second plurality of identical subsets of resources when the wireless device has a path loss or a distance to the serving base station that is less than a second threshold (1304).

Figure 14:
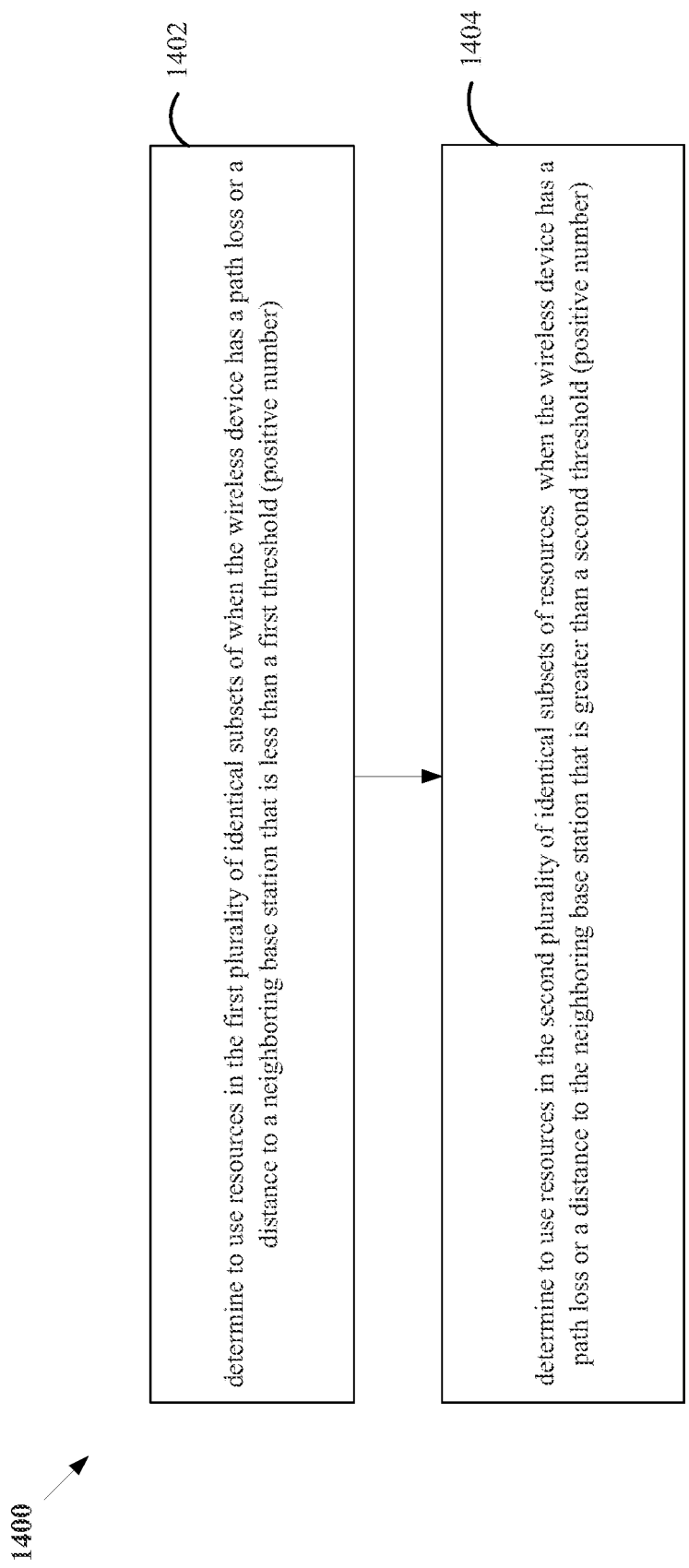
FIG. 14 is a flow chart of yet another method of wireless communication of a wireless device.

FIG. 14 is a flow chart 1400 of yet another method of wireless communication of a wireless device. According to the method, a wireless device determines to use the one grouping of peer discovery resources (1202) by determining to use resources in the first plurality of identical subsets of resources when the wireless device has a path loss or a distance to a neighboring base station that is less than a first threshold (1402), and by determining to use resources in the second plurality of identical subsets of resources when the wireless device has a path loss or a distance to the neighboring base station that is greater than a second threshold (1404).

Figure 15:
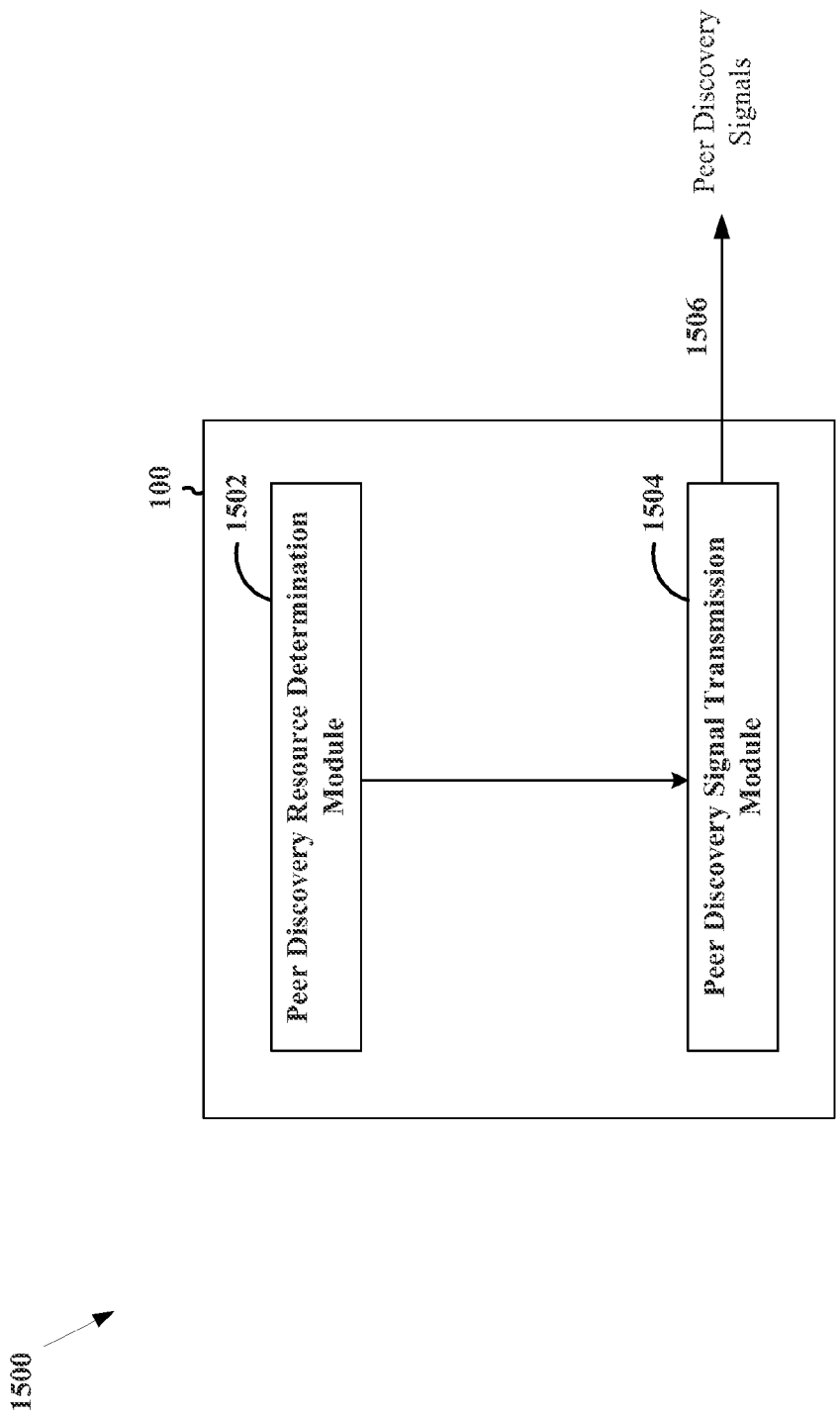
FIG. 15 is a conceptual block diagram illustrating the functionality of an exemplary wireless device apparatus.

FIG. 15 is a conceptual block diagram 1500 illustrating the functionality of an exemplary wireless device apparatus 100. The apparatus 100 includes a peer discovery resource determination module 1502 that determines to use one grouping of peer discovery resources of a plurality of groupings of peer discovery resources based on one of a path loss or a distance to a base station. The plurality of groupings include a first grouping of resources having a first plurality of identical subsets of resources and a second grouping of resources having a second plurality of identical subsets of resources. Each of the first plurality of identical subsets of resources extends over at least one of a different time period or a different number of subcarriers than each of the second plurality of identical subsets of resources. The apparatus 100 further includes a peer discovery signal transmission module 1504 that transmits a peer discovery signal 1506 on one subset of the identical subsets of the one grouping of peer discovery resources. The apparatus 100 may include additional modules that perform each of the steps in the aforementioned flow charts of FIGS. 12, 13, 14. As such, each step in the aforementioned flow charts of FIGS. 12, 13, 14 may be performed by a module and the apparatus 100 may include one or more of those modules.

Figure 16:
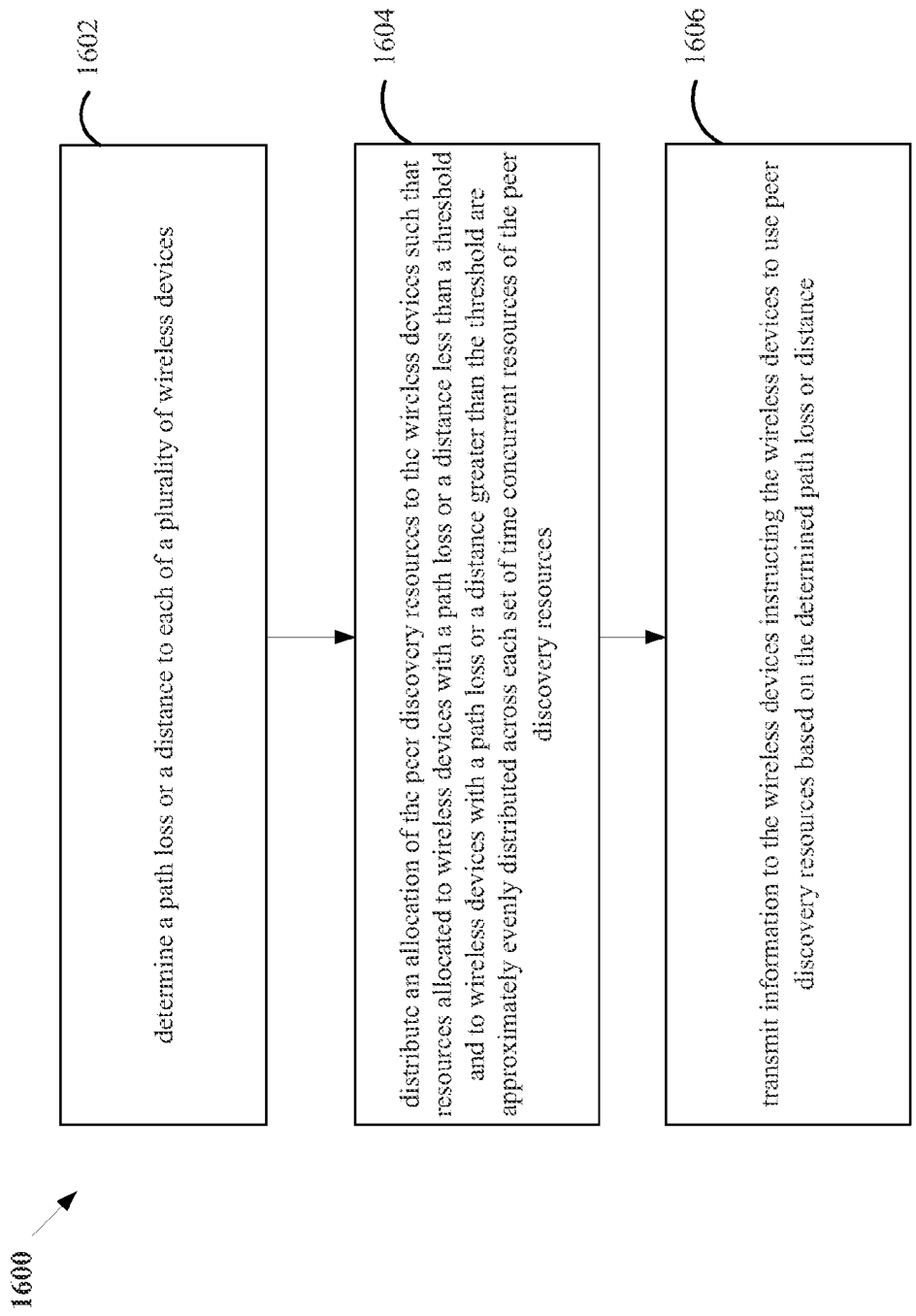
FIG. 16 is a flow chart of a method of wireless communication of a base station.

FIG. 16 is a flow chart 1600 of a method of wireless communication of a base station. According to the method, the base station determines a path loss or a distance to each of a plurality of wireless devices (1602). In addition, the base station transmits information to the wireless devices instructing the wireless devices to use peer discovery resources based on the determined path loss or distance (1606). The base station may also distribute an allocation of the peer discovery resources to the wireless devices such that resources allocated to wireless devices with a path loss or a distance less than a threshold and to wireless devices with a path loss or a distance greater than the threshold are approximately evenly distributed across each set of time concurrent resources of the peer discovery resources (1604).

Figure 17:
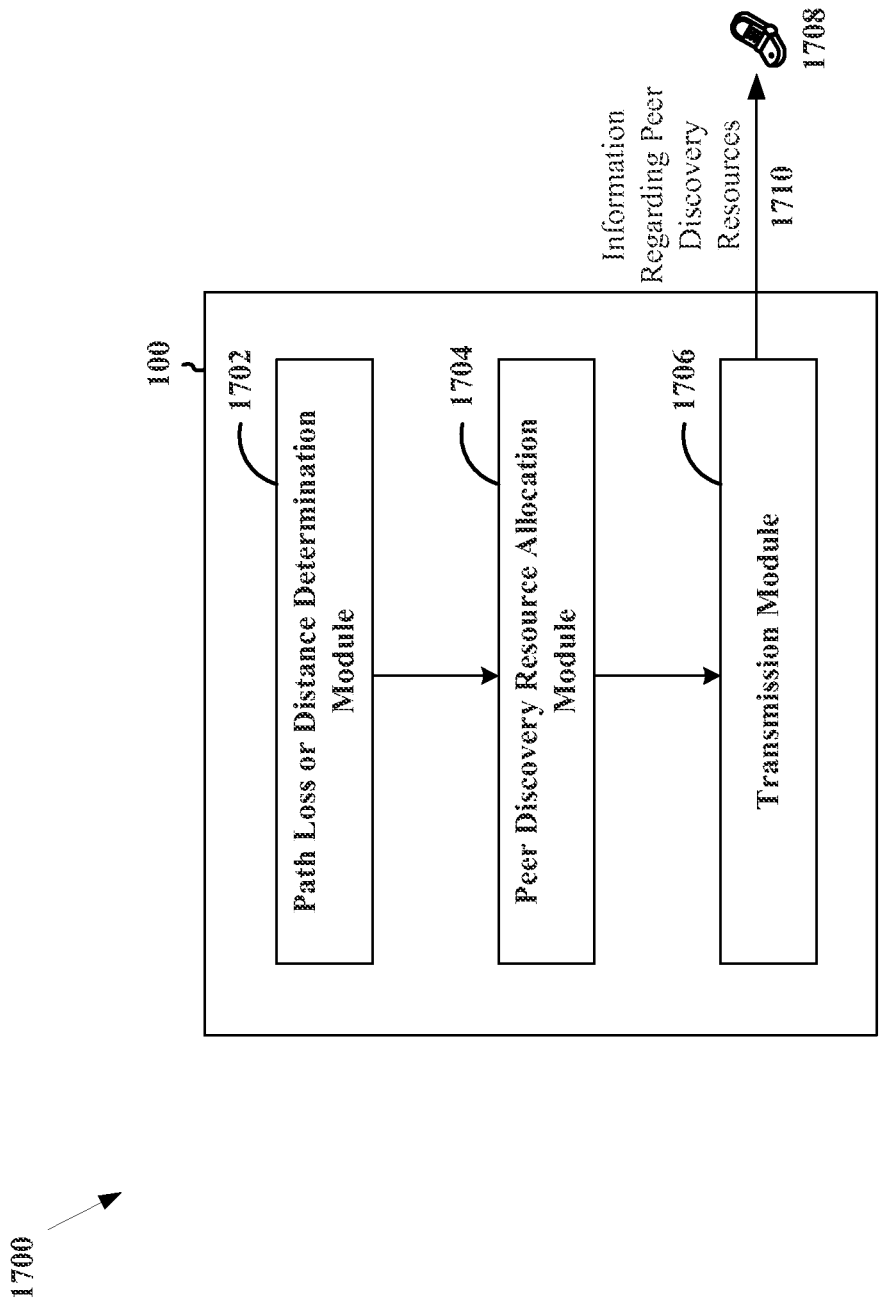
FIG. 17 is a conceptual block diagram illustrating the functionality of an exemplary base station apparatus.

FIG. 17 is a conceptual block diagram 1700 illustrating the functionality of an exemplary base station apparatus 100. The apparatus 100 includes a path loss or distance determination module 1702 that determines a path loss or a distance to each of a plurality of wireless devices. The apparatus 100 further includes a transmission module 1706 that transmits information 1710 to the wireless devices (e.g., the wireless device 1708) instructing the wireless devices to use peer discovery resources based on the determined path loss or distance. The apparatus 100 may further include a peer discovery resource allocation module 1704 that distributes an allocation of the peer discovery resources to the wireless devices such that resources allocated to wireless devices with a path loss or a distance less than a threshold and to wireless devices with a path loss or a distance greater than the threshold are approximately evenly distributed across each set of time concurrent resources of the peer discovery resources. The apparatus 100 may include additional modules that perform each of the steps in the aforementioned flow chart of FIG. 16. As such, each step in the aforementioned flow chart of FIG. 16 may be performed by a module and the apparatus 100 may include one or more of those modules.

Referring to FIG. 1 and FIG. 15, in one configuration, the apparatus 100 for wireless communication includes means for determining to use one grouping of peer discovery resources of a plurality of groupings of peer discovery resources based on one of a path loss or a distance to a base station. The plurality of groupings include a first grouping of resources having a first plurality of identical subsets of resources and a second grouping of resources having a second plurality of identical subsets of resources. Each of the first plurality of identical subsets of resources extends over at least one of a different time period or a different number of subcarriers than each of the second plurality of identical subsets of resources. The apparatus 100 further includes means for transmitting a peer discovery signal on one subset of the identical subsets of said one grouping of peer discovery resources. The aforementioned means is the processing system 114 of FIG. 1 or one or more of the modules of FIG. 15 configured to perform the functions recited by the aforementioned means.

Referring to FIG. 1 and FIG. 17, in one configuration, the apparatus 100 for wireless communication includes means for determining a path loss or a distance to each of a plurality of wireless devices, and means for transmitting information to the wireless devices instructing the wireless devices to use peer discovery resources based on the determined path loss or distance. The apparatus 100 may further include means for distributing an allocation of the peer discovery resources to the wireless devices such that resources allocated to wireless devices with a path loss or a distance less than a threshold and to wireless devices with a path loss or a distance greater than the threshold are approximately evenly distributed across each set of time concurrent resources of the peer discovery resources. The apparatus 100 may further include means for summing path losses and distances for each set of concurrent resources such that at least one of a maximum is minimized or a minimum is maximized across the concurrent resources. The aforementioned means is the processing system 114 of FIG. 1 or one or more of the modules of FIG. 17 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of operating a wireless device, comprising:
   determining to use a first grouping of peer discovery resources of a plurality of groupings of peer discovery resources based on one of a path loss or a distance to a local base station if the path loss or the distance to the local base station is greater than a threshold and determining to use a second grouping of peer discovery resources of a plurality of groupings of peer discovery resources based on one of the path loss or the distance to the local base station if the path loss or the distance to the local base station is less than the threshold, the first grouping of peer discovery resources having a first plurality of identical subsets of resources and the second grouping of peer discovery resources having a second plurality of identical subsets of resources, each of the first plurality of identical subsets of resources extending over at least one of a different time period or a different number of subcarriers than each of the second plurality of identical subsets of resources;
   wherein the first grouping of peer discovery resources or the second grouping of peer discovery resources overlaps resources of an adjacent base station; and
   transmitting a peer discovery signal on one subset of the identical subsets of resources of the determined of said first grouping of peer discovery resources or said second grouping of peer discovery resources.

2. The method of claim 1, wherein each of the first plurality of identical subsets of resources extends over a different time period and a different number of subcarriers than each of the second plurality of identical subsets of resources.

3. The method of claim 2, wherein each of the first plurality of identical subsets of resources extends over a first time period and over a first number of subcarriers, each of the second plurality of identical subsets of resources extends over a second time period and over a second number of subcarriers, the first time period is less than the second time period, and the first number of subcarriers is greater than the second number of subcarriers.

4. The method of claim 1, wherein each of the first plurality of identical subsets of resources extends over a different number of subcarriers than each of the second plurality of identical subsets of resources, each of the first plurality of identical subsets of resources extends over a first number of subcarriers, each of the second plurality of identical subsets of resources extends over a second number of subcarriers, and the first number of subcarriers is greater than the second number of subcarriers.

5. The method of claim 4, wherein the determining to use said first or second grouping of peer discovery resources comprises:
   determining to use resources in the first plurality of identical subsets of resources when the wireless device has a path loss or a distance to a serving base station that is greater than a first threshold; and
   determining to use resources in the second plurality of identical subsets of resources when the wireless device has a path loss or a distance to the serving base station that is less than a second threshold.

6. The method of claim 4, wherein the determining to use said first or second grouping of peer discovery resources comprises:

determining to use resources in the first plurality of identical subsets of resources when the wireless device has a path loss or a distance to a neighboring base station that is less than a first threshold; and determining to use resources in the second plurality of identical subsets of resources when the wireless device has a path loss or a distance to the neighboring base station that is greater than a second threshold.

7. An apparatus for wireless communication, comprising:
means for determining to use a first grouping of peer discovery resources of a plurality of groupings of peer discovery resources based on one of a path loss or a distance to a local base station if the path loss or the distance to the local base station is greater than a threshold and means for determining to use a second grouping of peer discovery resources of a plurality of groupings of peer discovery resources based on one of the path loss or the distance to the local base station if the path loss or the distance to the local base station is less than the threshold, the first grouping of peer discovery resources having a first plurality of identical subsets of resources and the second grouping of peer discovery resources having a second plurality of identical subsets of resources, each of the first plurality of identical subsets of resources extending over at least one of a different time period or a different number of subcarriers than each of the second plurality of identical subsets of resources;
wherein the first grouping of peer discovery resources or the second grouping of peer discovery resources overlaps resources of an adjacent base station; and
means for transmitting a peer discovery signal on one subset of the identical subsets of resources of the determined of said first grouping of peer discovery resources or said second grouping of peer discovery resources.

8. The apparatus of claim 7, wherein each of the first plurality of identical subsets of resources extends over a different time period and a different number of subcarriers than each of the second plurality of identical subsets of resources.

9. The apparatus of claim 8, wherein each of the first plurality of identical subsets of resources extends over a first time period and over a first number of subcarriers, each of the second plurality of identical subsets of resources extends over a second time period and over a second number of subcarriers, the first time period is less than the second time period, and the first number of subcarriers is greater than the second number of subcarriers.

10. The apparatus of claim 7, wherein each of the first plurality of identical subsets of resources extends over a different number of subcarriers than each of the second plurality of identical subsets of resources, each of the first plurality of identical subsets of resources extends over a first number of subcarriers, each of the second plurality of identical subsets of resources extends over a second number of subcarriers, and the first number of subcarriers is greater than the second number of subcarriers.

11. The apparatus of claim 10, wherein the means for determining to use said first or second grouping of peer discovery resources is configured to:
determine to use resources in the first plurality of identical subsets of resources when the apparatus has a path loss or a distance to a serving base station that is greater than a first threshold; and
determine to use resources in the second plurality of identical subsets of resources when the apparatus has a path loss or a distance to the serving base station that is less than a second threshold.

12. The apparatus of claim 10, wherein the means for determining to use said first or second grouping of peer discovery resources is configured to:
determine to use resources in the first plurality of identical subsets of resources when the apparatus has a path loss or a distance to a neighboring base station that is less than a first threshold; and
determine to use resources in the second plurality of identical subsets of resources when the apparatus has a path loss or a distance to the neighboring base station that is greater than a second threshold.

13. An apparatus for wireless communication, comprising:
a memory; and at least one processor coupled to the memory and processing system configured to:
determine to use a first grouping of peer discovery resources of a plurality of groupings of peer discovery resources based on one of a path loss or a distance to a local base station if the path loss or the distance to the local base station is greater than a threshold and determine to use a second grouping of peer discovery resources of a plurality of groupings of peer discovery resources based on one of the path loss or the distance to the local base station if the path loss or the distance to the local base station is less than the threshold, the first grouping of peer discovery resources having a first plurality of identical subsets of resources and the second grouping of peer discovery resources having a second plurality of identical subsets of resources, each of the first plurality of identical subsets of resources extending over at least one of a different time period or a different number of subcarriers than each of the second plurality of identical subsets of resources;
wherein the first grouping of peer discovery resources or the second grouping of peer discovery resources overlaps resources of an adjacent base station; and
transmit a peer discovery signal on one subset of the identical subsets of resources of the determined of said first grouping of peer discovery resources or said second grouping of peer discovery resources.

14. The apparatus of claim 13, wherein each of the first plurality of identical subsets of resources extends over a different time period and a different number of subcarriers than each of the second plurality of identical subsets of resources.

15. The apparatus of claim 14, wherein each of the first plurality of identical subsets of resources extends over a first time period and over a first number of subcarriers, each of the second plurality of identical subsets of resources extends over a second time period and over a second number of subcarriers, the first time period is less than the second time period, and the first number of subcarriers is greater than the second number of subcarriers.

16. The apparatus of claim 13, wherein each of the first plurality of identical subsets of resources extends over a different number of subcarriers than each of the second plurality of identical subsets of resources, each of the first plurality of identical subsets of resources extends over a first number of subcarriers, each of the second plurality of identical subsets of resources extends over a second number of subcarriers, and the first number of subcarriers is greater than the second number of subcarriers.

17. The apparatus of claim 16, wherein to determine to use said first or second grouping of peer discovery resources, the processing system is configured to:
determine to use resources in the first plurality of identical subsets of resources when the apparatus has a path loss or a distance to a serving base station that is greater than a first threshold; and determine to use resources in the second plurality of identical subsets of resources when the apparatus has a path loss or a distance to the serving base station that is less than a second threshold.

18. The apparatus of claim 16, wherein to determine to use said first or second grouping of peer discovery resources, the processing system is configured to:
   determine to use resources in the first plurality of identical subsets of resources when the apparatus has a path loss or a distance to a neighboring base station that is less than a first threshold; and
   determine to use resources in the second plurality of identical subsets of resources when the apparatus has a path loss or a distance to the neighboring base station that is greater than a second threshold.

19. A computer program product in a wireless device, comprising:
   a non-transitory computer-readable medium storing code for:
      determining to use a first grouping of peer discovery resources of a plurality of groupings of peer discovery resources based on one of a path loss or a distance to a local base station if the path loss or the distance to the local base station is greater than a threshold and determining to use a second grouping of peer discovery resources of a plurality of groupings of peer discovery resources based on one of the path loss or the distance to the local base station if the path loss or the distance to the local base station is less than the threshold, the first grouping of peer discovery resources having a first plurality of identical subsets of resources and the second grouping of peer discovery resources having a second plurality of identical subsets of resources, each of the first plurality of identical subsets of resources extending over at least one of a different time period or a different number of subcarriers than each of the second plurality of identical subsets of resources;
      wherein the first grouping of peer discovery resources or the second grouping of peer discovery resources overlaps resources of an adjacent base station; and
      transmitting a peer discovery signal on one subset of the identical subsets of resources of the determined of said first grouping of peer discovery resources or said second grouping of peer discovery resources, wherein a processor executes the code.

20. The computer program product of claim 19, wherein each of the first plurality of identical subsets of resources extends over a different time period and a different number of subcarriers than each of the second plurality of identical subsets of resources.

21. The computer program product of claim 20, wherein each of the first plurality of identical subsets of resources extends over a first time period and over a first number of subcarriers, each of the second plurality of identical subsets of resources extends over a second time period and over a second number of subcarriers, the first time period is less than the second time period, and the first number of subcarriers is greater than the second number of subcarriers.

22. The computer program product of claim 19, wherein each of the first plurality of identical subsets of resources extends over a different number of subcarriers than each of the second plurality of identical subsets of resources, each of the first plurality of identical subsets of resources extends over a first number of subcarriers, each of the second plurality of identical subsets of resources extends over a second number of subcarriers, and the first number of subcarriers is greater than the second number of subcarriers.

23. The computer program product of claim 22, wherein the determining to use said first or second grouping of peer discovery resources comprises:
   determining to use resources in the first plurality of identical subsets of resources when the wireless device has a path loss or a distance to a serving base station that is greater than a first threshold; and
   determining to use resources in the second plurality of identical subsets of resources when the wireless device has a path loss or a distance to the serving base station that is less than a second threshold.

24. The computer program product of claim 22, wherein the determining to use said first or second grouping of peer discovery resources comprises:
   determining to use resources in the first plurality of identical subsets of resources when the wireless device has a path loss or a distance to a neighboring base station that is less than a first threshold; and
   determining to use resources in the second plurality of identical subsets of resources when the wireless device has a path loss or a distance to the neighboring base station that is greater than a second threshold.

* * * * *